United States Patent [19]

Jacobs

[11] 4,416,349

[45] Nov. 22, 1983

[54] VISCOELASTICALLY DAMPED REINFORCED SKIN STRUCTURES

[75] Inventor: Loyd D. Jacobs, Bellevue, Wash.

[73] Assignee: The Boeing Company, Seattle, Wash.

[21] Appl. No.: 306,951

[22] Filed: Sep. 30, 1981

[51] Int. Cl.³ .............................................. F16F 15/00
[52] U.S. Cl. .................................... 181/208; 181/286;
    181/288; 181/290; 52/145; 52/807; 52/811;
    428/425.8
[58] Field of Search ............... 181/207, 208, 213, 214,
    181/222, 286, 292, 290; 52/144, 145, 806, 807,
    811, 393; 244/119; 428/425.8

[56] References Cited

U.S. PATENT DOCUMENTS

| | | | |
|---|---|---|---|
| 3,020,986 | 2/1962 | Kirk et al. | 52/806 |
| 3,087,574 | 4/1963 | Watters | 181/208 |
| 3,976,269 | 8/1976 | Gupta | 52/144 X |
| 4,313,524 | 2/1982 | Rose | 181/222 X |

*Primary Examiner*—Benjamin R. Fuller
*Attorney, Agent, or Firm*—Christensen, O'Connor, Johnson & Kindness

[57] ABSTRACT

Viscoelastically damped reinforced skin structures wherein a sandwich skin having a relatively thick core is supported by structural elements, such as stringers and frames, are disclosed. In one form (FIG. 1), a main skin (15) is supported by stringers (13) that are in turn supported by frames (11). The skin, stringers and frames are securely attached to one another by any suitable means, such as a bonding adhesive, rivets, bolts, etc. Located between the stringers are core layers (17) formed of honeycomb or foam materials. A first plate (21) overlies each core layer and extends to the flanges of the adjacent stringer. A second plate (25) overlies each adjacent pair of first plates. The core layer is viscoelastically attached (19 and 23a) to the skin and the first plate; and, the first plate is viscoelastically attached (23b, c and 27a, b) to the stringer flanges and to the second plate. Alternatively, a single plate (49, FIG. 3) can overlie the core layers (47) and the stringers (43). In an alternative form of the invention (FIG. 4), the main skin (63) is located between the stringers (65) and the frames (61); and, is securely attached thereto. An outer skin (67) is viscoelastically attached (68a, b and 73) to the stringers (65) and to core layers (69). The core layers (69) are located between the main (63) and outer skin (67, and pairs of adjacent stringers (65). The core layers are also viscoelastically attached (71) to the main skin (63).

6 Claims, 4 Drawing Figures

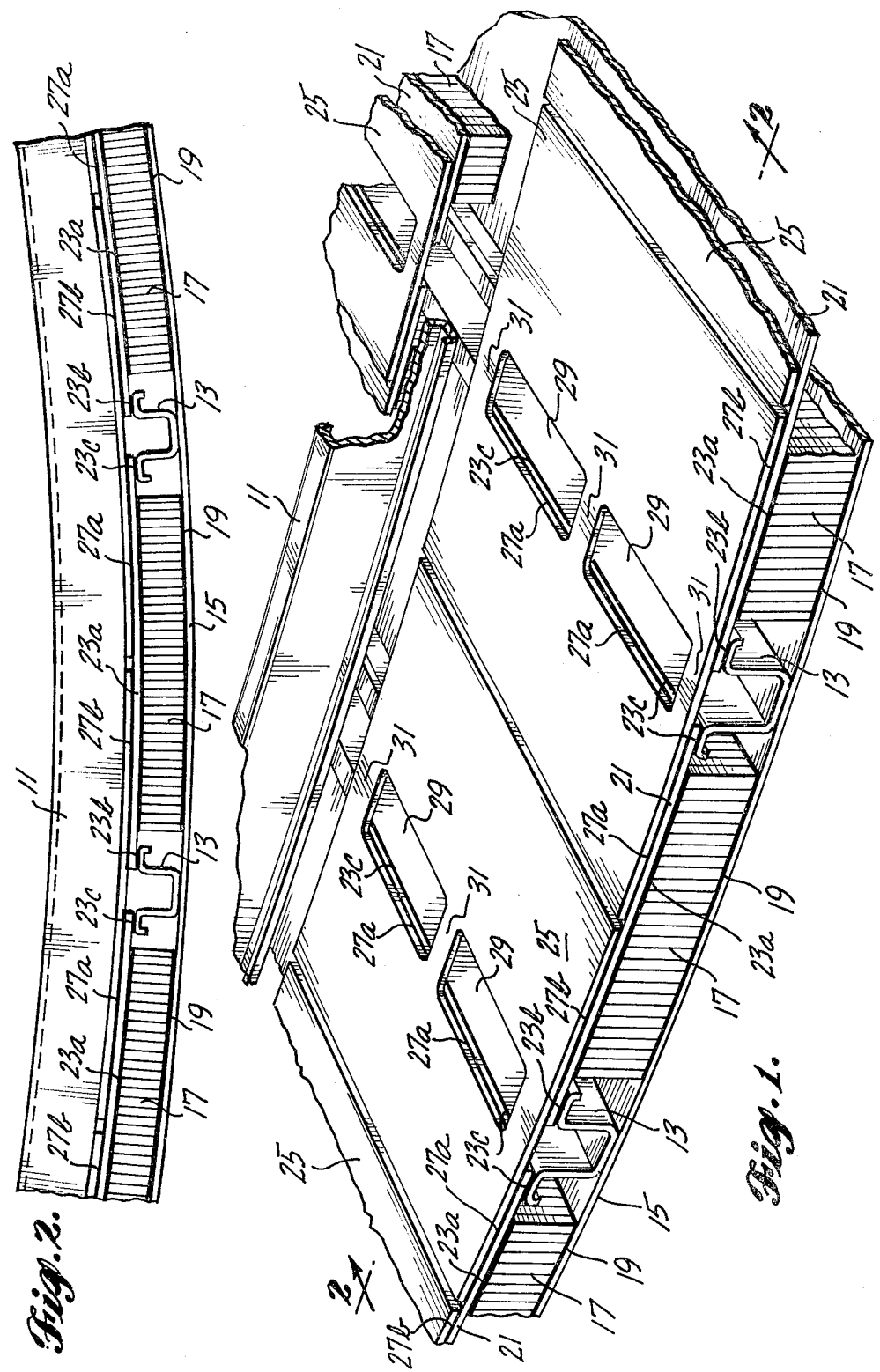

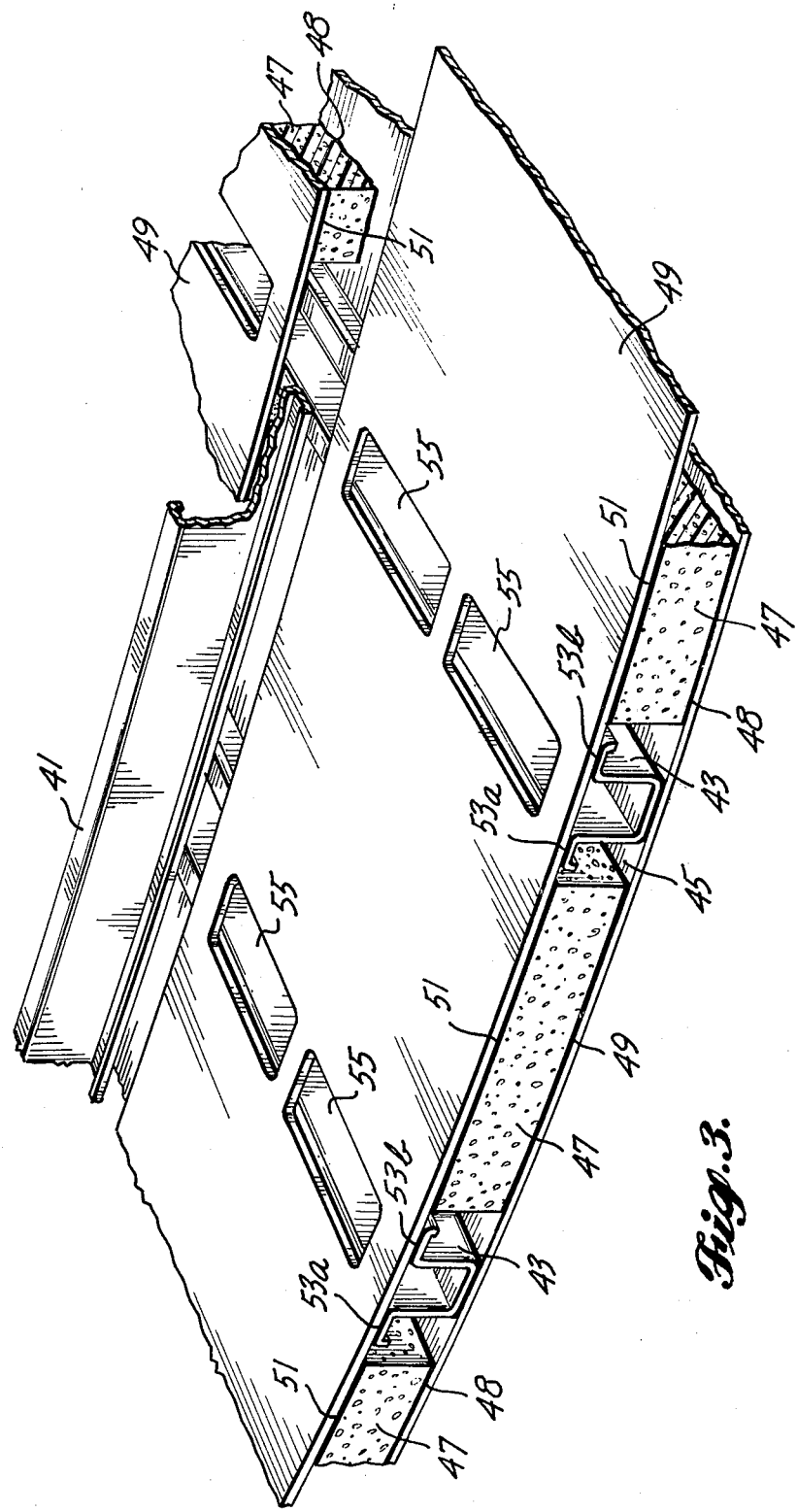

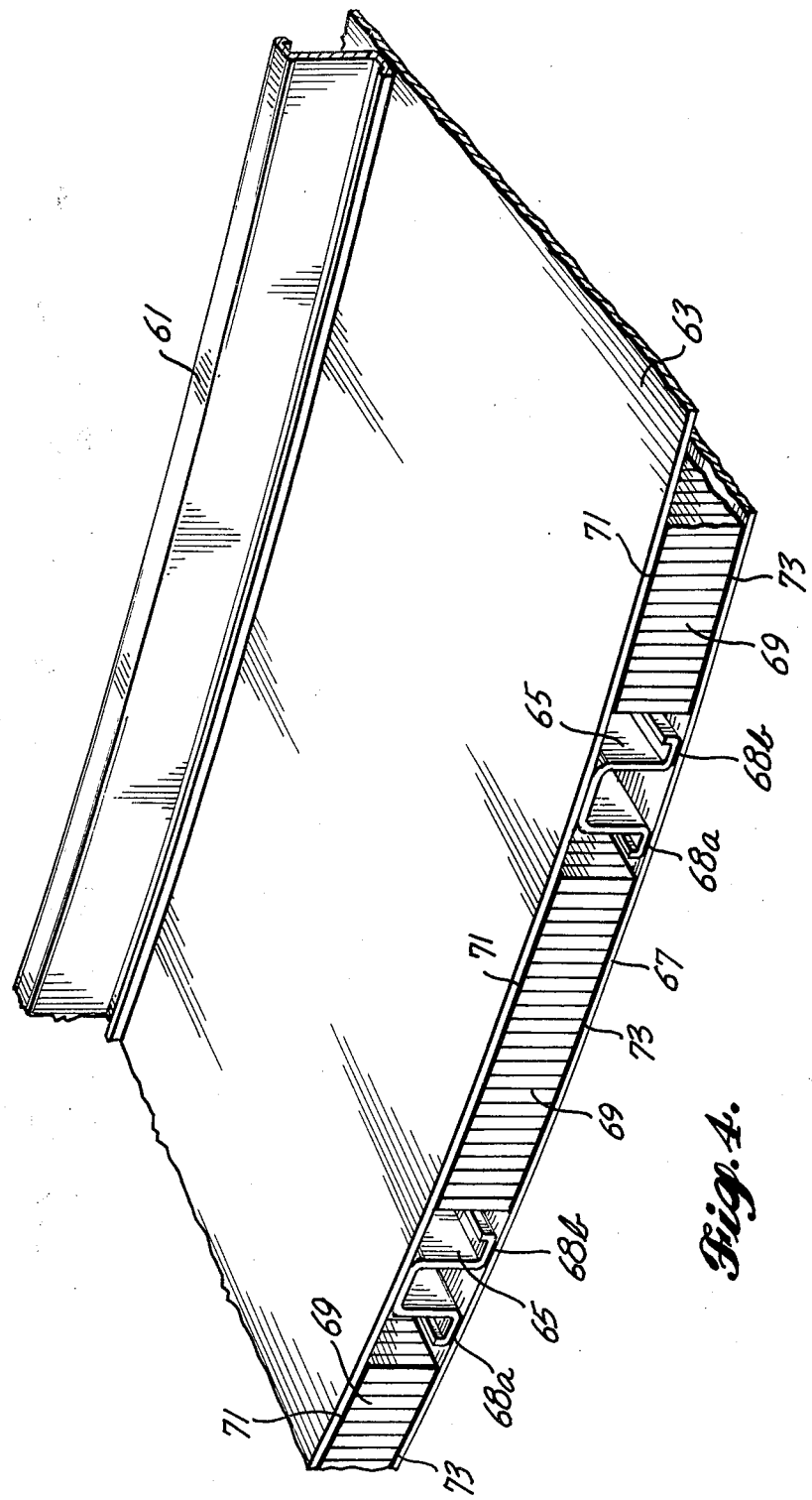

VISCOELASTICALLY DAMPED REINFORCED SKIN STRUCTURES

TECHNICAL AREA

This invention is directed to reducing the vibration and transmitted noise, and improving the sonic fatigue life, of reinforced skin structures; and, more particularly, to damping mechanisms for reducing the vibration and transmitted noise, and improving the sonic fatigue life, of reinforced skin structures by damping the vibration of the skin and reinforcing members that support the skin.

BACKGROUND OF THE INVENTION

While the hereinafter described invention was conceived for use in reducing the noise in the cabin of an aircraft, it is to be understood that the invention can be used in other environments and in other types of reinforced skin structures to reduce interior noise and vibration. This includes all types of transportation vehicles—automobiles, buses, trucks, ships, submarines, hovercraft and hydrofoils, for examples. The invention can also be used in the walls and floors of buildings and other enclosures where high noise transmission reduction is desired.

It is to be understood that, because interior noise is reduced by damping the vibrations of a reinforced skin structure, coincidental to the reduction of noise is a corresponding improvement in the sonic fatigue life of the structure and equipment attached to the structure. That is, reducing vibrations not only reduces noise, it also improves the sonic fatigue life of the vibrating structure and attached equipment.

Noise and vibration inside of a reinforced skin structure, such as the cabin of an aircraft, affects passenger speech communication, comfort and sleep. Noise and vibration can also cause structural fatigue and the malfunctioning of equipment mounted in regions of high noise and vibration. Since most transportation vehicles are designed to be as light in weight as possible (commensurate with structural requirements), in order to obtain maximum fuel efficiency, limitations are placed on what designers can do to reduce interior noise and vibration levels. These constraints are particularly severe in the aircraft design field where weight is extremely critical.

In general, noise in an aircraft can be segregated into noise contributing to the overall sound pressure level (OASPL) and noise contributing to the speech interference level (SIL). Typically, the OASPL is essentially determined by the low-frequency content of the noise and the SIL is determined by the mid- to high-frequency content of the noise. Since both the OASPL and the SIL affect passengers, a noise reduction over the entire audio frequency range and, in particular, the low- and mid-audio frequency range is desirable. On the other hand, the whole frequency range is a potential contributor to noise and vibration induced fatigue and malfunctioning of equipment. Even though the following discussion centers on the reduction of interior noise for passenger comfort, it is to be kept in mind that the invention is equally applicable to reducing the detrimental effects of noise and vibration on equipment and structure regardless of whether or not persons or passengers are in the surrounding environment.

Presently, the interior cabinet noise of an aircraft in the mid- and high-frequency range (above 600 Hz) is reduced by applying skin damping tape, lead vinyl sheeting and fiberglass insulation to the walls of the aircraft fuselage. While the use of such items to reduce noise are effective in the mid- and high-frequency range, they are essentially ineffective in the low-frequency range, particularly at frequencies below 300 Hz. Further, they are only moderately effective in the mid-frequency range between 300 and 600 Hz. As a result, the reduction of low- and mid-frequency cabin noise has remained a problem in present-day commercial aircraft.

While both low- and mid-frequency cabin noise remains a problem in commercial aircraft, the problem is acute in recently developed short takeoff and landing (STOL) aircraft, such as externally blown flap (EBF) and upper surface blown (USB) aircraft. The problem is acute in such STOL aircraft because the level of low-frequency interior noise is higher due to the proximity of the engines to the fuselage of the aircraft. As a result, it has now become even more desirable to provide improved methods and apparatus for reducing the OASPL and the SIL in the cabin of an aircraft.

In the past, it was generally believed that cabin noise below about 600 Hz was controlled by the structural stiffness of the fuselage of the aircraft. Thus, attempts to reduce low- and mid-frequency cabin noise were based on various methods of increasing fuselage structural stiffness. For example, in one attempt, the number of stringers in the fuselage of a modern aircraft were doubled to increase the structural stiffness of the fuselage and, thereby, reduce cabin noise. Test data taken on this aircraft indicated that although this 100 percent increase in stringer weight was partially effective in reducing cabin noise in the mid-frequency range (e.g. 300–600 Hz), it was ineffective in the low-frequency range (e.g. below 300 Hz). Thus, although this change improved the subjective impression of the noise level in the cabin of the aircraft, the overall sound pressure level (OASPL) was virtually unaffected.

In recent years, it has been found that during cruise, when pressurization loads cause the skin panel frequency of an aircraft to be higher than the stringer frequency, the coupled mode of the overall reinforced skin structure is such that the skin acts like a very stiff member, supported by relatively flexible stringers. In this regard, attention is directed to U.S. Pat. No. 3,976,269, entitled "Intrinsically Tuned Structural Panel", by Gautam SenGupta. This coupled mode is a very strong radiator of sound because a large section of the skin vibrates in phase. That is, the individual sections of the skin vibrate in phase, whereby vibrations combine to form noise sources having a relatively high magnitude. Since the skin responds like a very stiff member, very little skin flexural bending action takes place. As a result, the application of damping devices (e.g., damping tape), to the skin is not very effective in reducing the low frequency noise produced by such structures. On the other hand, the vibration response of this coupled mode is strongly determined by the deflection of the relatively flexible stringers. As a result, damping the stringers is a very effective way of reducing the low frequency response of the overall structure.

A method and apparatus for significantly reducing the noise produced by stringer response is described in U.S. patent application Ser. No. 029,705, entitled "Method and Apparatus for Reducing Low- to Mid-Frequency Interior Noise", filed Apr. 11, 1979, by Gautam SenGupta and Byron R. Spain. This patent application describes reducing stringer response to vibration disturbances by applying rigid strips along the stringer flanges, the rigid strips being attached to the flanges by thin viscoelastic layers. This method of stringer damping has been found to reduce low-frequency structural vibration and cabin noise during cruise.

While stringer damping using the method and apparatus described in the foregoing patent application is effective in reducing noise when stringer vibration is the dominant noise source, when skin vibration is the dominant noise source, this method is ineffective. In this regard, during takeoff skin vibration is the dominant noise source in most presently designed aircraft. In order to overcome this problem, the foregoing patent application teaches forming the aircraft fuselage such that the fundamental frequency of the skin is higher than the fundamental frequency of the skin-supporting stringers. However, unless this is achieved through cabin pressurization, this approach can lead to an increase in the weight of the aircraft. Alternatively, separate devices can be used to damp skin vibrations. Because the separate devices must cover substantially the entire skin area they add a substantial (and, thus, undesirable) amount of weight.

A method and apparatus for decreasing the amount of weight required when separate damping mechanisms are applied to both the structural reinforcing components and the skin is described in U.S. patent application Ser. No. 079,325, entitled "Method and Apparatus for Wideband Vibration Damping of Reinforced Skin Structures", filed Sept. 27, 1979, by Loyd D. Jacobs, Gautam SenGupta and Byron R. Spain. This patent application describes a method and apparatus for damping the vibration of a reinforced skin structure over a wide frequency range by viscoelastically attaching constraining elements to the skin and to the reinforcing members that support the skin. The constraining elements can be continuous or segmented. The viscoelastic attachment between the constraining elements and the reinforcing members directly damps the vibration of the reinforcing members; and, the viscoelastic attachment between the constraining elements and the skin directly damp the vibration of the skin. Further, the regions of the constraining elements extending between the regions viscoelastically attached to the reinforcing members and to the skin, forms a coupling that allows the skin viscoelastic attachment to indirectly damp the vibrations of the reinforcing member and vice versa. Resonant vibrations due to skin bending, torsional and extensional modes (both cylindrical and panel) and reinforcing member damping, torsional, extensional and tuning fork modes, are all damped.

While apparatus of the type described in U.S. patent application Ser. No. 079,325 reduces vibration and transmitted noise, and improves the sonic fatigue life of the associated structure, the constraining elements that couple the viscoelastic attachments to the reinforcing members and the skin are still add-on components whose only function is to damp the vibrating member. Other than damping, the add-on components do not improve the basic structural design with respect to previous designs. Obviously, it would be desirable to provide vibrational damping mechanisms that also improve other aspects of the structural design, such as thermal transmissibility (i.e., insulation) and manufacturability. The present invention is directed to achieving these results.

It is an object of this invention to provide a reinforced skin structure that includes a mechanism for damping the vibrational response of the reinforced skin structure.

It is another object of this invention to provide a reinforced skin structure that includes a mechanism for damping the vibrational response of the reinforced skin structure that also reduces the thermal transmission through the skin of the reinforced skin structure.

SUMMARY OF THE INVENTION

In accordance with this invention, reinforced skin structures that include viscoelastic damping mechanisms for reducing structural vibration and, thus, interior noise and structural damage are provided. In one form of the invention, a main skin is supported by stringers that are in turn supported by frames. The skin, stringers, and frames are securely attached together by any suitable means, such as a bonding adhesive, rivets, bolts, etc. Located between the stringers are core layers formed of honeycomb or foam materials. A plate overlies each core layer and the flanges of the adjacent stringer. The core layer is viscoelastically attached to the plate; and the plate is viscoelastically attached to the stringer flanges. A variation of this form of the invention comprises segmenting the plate between the flanges of a common stringer. The resultant set of first plates are covered by a set of second plates one of which spans the gap between adjacent pairs of first plates. The second plates are viscoelastically attached to the first plates. This variation is preferred in instances of high vibration because of the additional damping provided by the viscoelastic attachment between the two sets of plates.

In an alternaive form of the invention, the main skin is located between the stringers and the frames; and, securely attached thereto. An outer skin is viscoelastically attached to the stringers and to core layers located between the main and outer skins, and pairs of adjacent stringers. The core layers are also viscoelastically attached to the main skin. A variation of this form of the invention comprises layering the outer skin and viscoelastically joining the layers together.

As will be readily appreciated from the foregoing summary, the invention basically comprises a core layer that is directly viscoelastically attached to the main skin of the reinforced skin structure and indirectly viscoelastically attached to the reinforcing members (e.g., the stringers). In one form of the invention, the indirect attachment is via interior plates. In the other form of the invention, the indirect attachment is via an outer skin. In either case, the addition of a coupling mechanism for coupling the viscoelastic attachment regions together results in direct and indirect damping of the type described in U.S. patent application Ser. No. 079,325, identified more fully above. In addition, the use of a honeycomb or foam layer reduces thermal transmission through the skin of the reinforced skin structure.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a partial, perspective view of an embodiment of the invention wherein a main skin is supported by stringers and the stringers are in turn supported by the frames of a reinforced skin structure;

FIG. 2 is a cross-sectional view along lines 2—2 of FIG. 1;

FIG. 3 is a partial, perspective view of an alternative embodiment of the invention wherein a main skin is supported by stringers and the stringers are in turn supported by the frames of a reinforced skin structure; and FIG. 4 is a partial, perspective view of an embodiment of the invention wherein a main skin is mounted between the frames and the stringers and an outer skin is supported by the stringers of a reinforced skin structure.

DESCRIPTION OF THE PREFERRED EMBODIMENTS

The embodiments of the invention illustrated in the hereinafter described FIGURES are shown in structures suitable for use in forming the fuselage of an aircraft. However, it is to be understood that the invention can be utilized in other environments, including other areas of an aircraft, other types of vehicles and static structures.

The reinforced skin structure illustrated in FIGS. 1 and 2 comprises: a plurality of frames 11 (only one of which is shown); a plurality of stringers 13; and, a skin 15. The frame 11 is illustrated as having a Z-shaped cross-sectional configuration; and, the stringers 13 are illustrated as having a return flange hat-shaped cross-sectional configuration. The stringers 13 lie parallel to one another and are supported by the frame 11. Typically, the plane of the frame 11 lies orthogonal to the longitudinal axes of the stringers 13. The stringers 13 are affixed to the frame 11 by any suitable attachment medium, such as rivets or bolts, for examples. The skin 15 is affixed to the ccross members of the stringers 13 by any suitable attachment medium, such as an adhesive bonding agent, rivets, bolts, etc., or a combination thereof.

Also illustrated in FIG. 1 is a damping mechanism formed in accordance with the invention. The damping mechanism includes: honeycomb core layers 17; and, first and second panels 21 and 25. The honeycomb core layers 17 are positioned between adjacent stringers 13. The longitudinal axes of the cells of the honeycomb core layers lie orthogonal to the surface of the skin 15. The thickness of the honeycomb core layers 17 is substantially equal to the height of the hat-shaped stringers 13. Preferably, the honeycomb core layers 17 are attached to the skin 15 by skin/core viscoelastic layers 19. Alternatively, if viscoelastic damping is not required or desired at the skin-honeycomb core layer interface, the attachment may take the form of a structurally rigid bond.

One of the first panels 21 overlie each honeycomb core layer 17 and the flanges of the adjacent stringer 13. The first panels 21 may be formed of suitably thin sheets of metal or other stiff material. Each first panel 21 is attached to the underlying honeycomb core layer 17 by a core/panel viscoelastic layer 23a and to the flanges of the adjacent stringer 13 by flange/panel viscoelastic layers 23b, and 23c.

One of the second panels 25 overlies each adjacent pair of first panels 21 and the stringer 13 lying therebetween. The second panels 25 are attached to the underlying portions of the first panels 21 by panel/panel viscoelastic layers 27a and 27b. While the second panels 25 can be solid, preferably, the second panels 25 include a plurality of cutouts 29 aligned with the space between the legs of the stringer 13 that each second panel 25 overlies. The cutouts are separated by spaced apart links 31. Thus, the portions of the second panels 25 that lie on either side of each stringer 13 are joined together. The cutouts are solely provided for the purpose of weight reduction.

As will be readily appreciated by those skilled in this art and others from viewing FIGS. 1 and 2, and the foregoing description, the honeycomb core layer 17, first and second panels 21 and 25, and the various layers of viscoelastic material coact to perform various functions. The main function is damping the vibrations of the skin 15 and/or the stringers 13. Damping the vibrations of these elements reduces the amount of noise that penetrates the interior (e.g., cabin) of the aircraft. Damping the vibrations of the skin and stringers also reduces sonic fatigue and, thus, increases the life of these elements.

Vibration damping is accomplished in two ways. First, vibration damping is directly accomplished by the viscoelastic layers attaching the vibrating element to the adjacent member. In the case of the skin 15, direct vibration damping is accomplished by the skin/core viscoelastic layers 19. In the case of the stringers 13, direct vibration damping is accomplished by the flange/panel viscoelastic layers 23b and 23c.

In addition to direct damping, indirect damping of skin and stringer vibrations is provided by the nonattaching viscoelastic layers. For example, indirect damping of skin vibration is accomplished by the core/panel viscoelastic layers 23a. This result occurs because skin vibration that is not damped by the skin/core viscoelastic layers 19 causes the honeycomb core layers to vibrate. The honeycomb core layer vibration are damped by the core/panel viscoelastic layers 23. In other words, the honeycomb core layers 17 couple residual skin vibration to the core/panel viscoelastic layers 23a. Similarly, the first panels 21 couple vibrations that are not damped by the skin/core viscoelastic layers 19 or the core/panel panel viscoelastic layers 23a to the flange/panel viscoelastic layers 23b and 23c. As a result, the flange/panel viscoelastic layers 23b and 23c provide further indirect damping of skin vibration. This same vibration coupling path functions in reverse, whereby stringer vibrations are indirectly damped by the first core panel viscoelastic layers 23a and the skin/core viscoelastic layers 19. Indirect viscoelastic damping of skin and stringer vibrations is also accomplished by the panel/panel viscoelastic layers 27a and 27b.

Since a variety of viscoelastic materials are available from various sources, such materials will not be described here, except to generally note that viscoelastic materials are materials that convert vibration energy into heat energy. The result of this conversion is a reduction in vibration magnitude and, thus, the effects of vibration (e.g., noise and sonic fatigue damage). Examples of viscoelastic materials useful in aircraft are set forth in U.S. patent application Ser. Nos. 029,705 and 079,325, which are more fully referenced above. As required for a complete understanding of the present invention, the relevant information contained in these applications is incorporated herein by reference.

In addition to the benefits achieved by damping the vibrations of a reinforced skin structure, the invention provides other advantages. Specifically, a further advantage of the invention is the improved insulation that results if the cells of the honeycomb core layers are filled with an insulating material, such as an insulating foam, or if the honeycomb core layer is replaced by an insulating foam layer, as illustrated in FIG. 3 and hereinafter described. In either case, heat transmission through the composite skin is reduced. In fact, even a dead air space honeycomb core layer improves the thermal insulation of the composite skin over a skin that does not include such a layer.

FIG. 3 illustrates a reinforced skin structure including an alternative embodiment of a damping mechanism formed in accordance with the invention. The primary differences between the damping mechanism illustrated in FIGS. 1 and 2 and the damping mechanism illustrated in FIG. 3 are: (1) forming the core layer of a foam material, rather than a honeycomb core material; and (2) forming the overlying interior layer from a single panel instead of two overlapping panels. More specifically, the reinforced skin structure illustrated in FIG. 3 comprises: a plurality of frames 41 (only one of which is shown); a plurality of stringers 43; and, a skin 45. The illustrated frame 41 has a Z-shaped cross-sectional configuration and the stringers 43 have a return flange hat-shaped cross-sectional configuration. The stringers 43 lie parallel to one another; and, generally orthogonal to the plane of the frame 41. The stringers 43 are securely affixed to the frame 41. Further, the skin 45 is securely affixed to the cross-members of the hat-shaped stringers 43. Located between each adjacent pair of stringers 43 and extending from frame to frame is a foam core layer 47. One surface of the foam core layer 47 is attached to the adjacent surface of the skin 45 by a skin/core viscoelastic layer 48. The opposed surfaces of the foam core layers 47 lie parallel to the flanges of the stringers 43. Overlying the flanges of the stringers 43 and the foam core layers 47 is a stiff panel 49. The panel 49 is attached to the foam core layers by core/panel viscoelastic layers 51 and to the flanges of the stringers 43 by flange/panel viscoelastic layers 53a and 53b. The stiff panel 49 may include weight reducing apertures 55 located where the panel overlies the region between the legs of the stringers 43.

As with the embodiment of the invention illustrated in FIGS. 1 and 2, the viscoelastic layers 48, 51 and 53a, b directly and indirectly damp the vibrations of the stringers 43 and the skin 45. Further, the foam core decreases thermal conductivity, i.e., the foam core thermally insulates the regions located on the opposite sides of the reinforced skin structure illustrated in FIG. 3. Obviously, if desired, a honeycomb core could be used instead of a foam core in actual embodiments of the version of the invention illustrated in FIG. 3.

FIG. 4 illustrates a reinforced skin structure wherein the stringers are located on the opposite side of a main skin from the frames, as opposed to the more conventional type of reinforced skin structure illustrated in FIGS. 1–3 wherein frames support stringers, which in turn support a skin. A skin between frame and stringer structure has the advantage that it is very conducive to constructing long bonds from frame to skin and skin to stringer. Thus, this structure is ideally suited to the creation of all bonded structures. Further, it is a relatively inexpensive structure because it has a low part count. Another advantage is that the frame acts directly as a tear stopper and, thus, constains skin fatigue damage. Thus, the inclusion of skin tear straps or frame to skin tear ties, included in conventional present-day aircraft structures, is eliminated, or substantially reduced.

Moreover, the reinforced skin structure illustrated in FIG. 4, which includes a damping mechanism formed in accordance with the invention, has improved structural strength when compared to similar types of prior art reinforced skin structures.

The reinforced skin structure illustrated in FIG. 4 comprises: a plurality of frames 61 (only one of which is shown); a main skin 63; and, a plurality of stringers 65. The frame 61 has a return flange Z-shaped cross-sectional configuration. The main skin 63 is affixed to the outer flange of the frame 61 by any suitable device, such as an adhesive bond, rivets, bolts etc., or a combination thereof. The stringers 65 have a return flange, hat-shaped, cross-sectional configuration. The cross members of the hat-shaped stringers 65 are affixed to the face of the main skin 63 remote from the face affixed to the outer flange of the frame 61. The stringers 65 are positioned such that their longitudinal axes generally lie parallel to one another and generally orthogonal to the plane of the frame 61.

The main skin 63 is the structural skin of the overall reinforced skin structure illustrated in FIG. 4. Because an aircraft requires a smooth outer surface, which is not provided if the stringers 65 are exposed, the stringers are covered by a light-weight outer skin 67. The outer skin 67 is attached to the flanges of the stringers 65 by skin/flange viscoelastic layers 68a and 68b. Located between the stringers are core layers 69, which may be formed of a honeycomb core material or a foam material. The thickness of the core layers 69 is equal to the height of the stringers 65. The surface of the core layers 69 facing the main skin 63 are attached thereto by skin/core viscoelastic layers 71. The surfaces of the core layers 69 facing the thin outer skin 67 are attached thereto by core/skin viscoelastic layers 73.

As with the previously described reinforced skin structures that include a damping mechanism formed in accordance with the invention, vibration of the main skin and the stringers of the reinforced skin structure illustrated in FIG. 4 are directly and indirectly viscoelastically damped. The viscoelastic damping decreases the noise produced by the vibrating element or elements. The viscoelastic damping of the vibrating elements also increases the sonic fatigue life of these elements. Further, decreased thermal conductivity through the composite skin is provided.

As will be readily appreciated from the foregoing description, a damping mechanism formed in accordance with the invention basically comprises a core layer and a panel or secondary (e.g., outer) skin arrangement that couples viscoelastic layers together to get the advantage of indirect viscoelastic damping, as well as direct viscoelastic damping. The core layer also improves the skin insulation of the reinforced skin structure.

While preferred embodiments of the invention have been illustrated and described, it will be appreciated that various changes can be made therein without departing from the spirit and scope of the invention. For example, if desired, the single outer skin illustrated in FIG. 4 could be replaced by a multilayer skin having a form similar to the pair of overlapping panels illustrated in FIGS. 1 and 2 and described above. Consequently, the invention can be practiced otherwise than as specifically described herein.

The embodiments of the invention in which an exclusive property or privilege is claimed are defined as follows:

1. In a reinforced skin structure including a plurality of frames, a plurality of spaced-apart stringers and a skin, said plurality of stringers being affixed to and supported by said plurality of frames, said skin being affixed to and supported by said plurality of stringers, said plurality of stringers having a U-shape with outwardly projecting flanges oriented such that said skin is affixed to the crossmembers of said U-shaped stringers and the flanges of said U-shaped stringers are affixed to said plurality of frames, the improvement comprising an integral damping mechanism, said integral damping mechanism comprising:

(A) core layers attached to said skin and located between adjacent pairs of spaced-apart stringers; and, (B) viscoelastic coupling means for selectively attaching said core layers to said stringers, said viscoelastic coupling means comprising:

(1) a relatively stiff coupling comprising:
 (a) a first panel comprising a plurality of sections, each of said first panel sections extending from the flange of one of said stringers to the flange of the next adjacent stringer so as to overlie the core layer lying between said adjacent stringers; and,
 (b) a second panel comprising a plurality of sections, each of said second panel sections overlying an adjacent pair of first panel sections so as to span the area between the flanges of a U-shaped stringer;

(2) stringer/coupling viscoelastic layers for attaching said first panel sections to said stringers;

(3) core/coupling viscoelastic layers for attaching said first panel sections to said core layers; and (4) panel/panel viscoelastic layers for attaching said second panel sections to said first panel sections.

2. The improvement claimed in claim 1 wherein said core layers are attached to said skin by skin/core layers of viscoelastic material.

3. The improvement claimed in claim 2 wherein said core layers are formed of a honeycomb core material.

4. The improvement claimed in claim 2 wherein said core layers are formed of a foam material.

5. The improvement claimed in claim 1 wherein said core layers are formed of a honeycomb core material.

6. The improvement claimed in claim 1 wherein said core layers are formed of a foam material.

* * * * *